US009327168B2

(12) United States Patent
Bulpett et al.

(10) Patent No.: US 9,327,168 B2
(45) Date of Patent: May 3, 2016

(54) METHODS FOR MAKING POLYUREA AND POLYURETHANE POLYMERS AND GOLF BALLS PREPARED THEREFROM

(71) Applicant: Acushnet Company, Fairhaven, MA (US)

(72) Inventors: David A. Bulpett, Fairhaven, MA (US); Brian Comeau, Fairhaven, MA (US); Michael Michalewich, Fairhaven, MA (US); Shawn Ricci, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 14/317,407

(22) Filed: Jun. 27, 2014

(65) Prior Publication Data

US 2014/0308444 A1 Oct. 16, 2014

Related U.S. Application Data

(63) Continuation-in-part of application No. 13/941,749, filed on Jul. 15, 2013, now Pat. No. 9,211,444, which is a continuation of application No. 12/975,491, filed on Dec. 22, 2010, now Pat. No. 8,487,063.

(51) Int. Cl.
| | |
|---|---|
| *A63B 37/12* | (2006.01) |
| *C08G 18/10* | (2006.01) |
| *A63B 45/00* | (2006.01) |
| *C08G 18/72* | (2006.01) |
| *A63B 37/00* | (2006.01) |
| *C08L 21/00* | (2006.01) |

(52) U.S. Cl.
CPC .............. *A63B 45/00* (2013.01); *A63B 37/0023* (2013.01); *A63B 37/0027* (2013.01); *A63B 37/0039* (2013.01); *A63B 37/0051* (2013.01); *A63B 37/0058* (2013.01); *A63B 37/0059* (2013.01); *A63B 37/0074* (2013.01); *A63B 37/0075* (2013.01); *A63B 37/0076* (2013.01); *C08G 18/10* (2013.01); *C08G 18/721* (2013.01); *C08L 21/00* (2013.01)

(58) Field of Classification Search
None
See application file for complete search history.

(56) References Cited

U.S. PATENT DOCUMENTS

| | | | | |
|---|---|---|---|---|
| 4,191,818 | A | 3/1980 | Illers et al. | 528/44 |
| 4,413,111 | A * | 11/1983 | Markusch et al. | 528/59 |
| 4,555,562 | A | 11/1985 | Lee et al. | 528/72 |
| 4,560,168 | A | 12/1985 | Aoyama | 273/232 |
| 4,686,242 | A | 8/1987 | Turner et al. | 521/137 |
| 4,933,416 | A | 6/1990 | Gillis et al. | 528/74.5 |
| 4,960,281 | A | 10/1990 | Aoyama | 273/232 |
| 5,248,821 | A | 9/1993 | Lin et al. | 564/55 |
| 5,334,673 | A | 8/1994 | Wu | 273/235 |
| 5,484,870 | A | 1/1996 | Wu | 528/28 |
| 6,207,784 | B1 | 3/2001 | Rajagopalan | 528/71 |
| 6,437,076 | B1 | 8/2002 | DiDomenico et al. | 528/72 |
| 6,437,078 | B1 | 8/2002 | Smith | 528/78 |
| 6,476,176 | B1 | 11/2002 | Wu | 528/76 |
| 6,506,851 | B2 | 1/2003 | Wu | 525/415 |
| 6,627,699 | B2 | 9/2003 | Sawitski, Jr. et al. | 524/871 |
| 6,756,436 | B2 | 6/2004 | Rajagopalan et al. | 524/322 |
| 6,797,786 | B2 * | 9/2004 | Takesue et al. | 525/330.2 |
| 6,867,279 | B2 | 3/2005 | Wu | 528/61 |
| 6,884,904 | B2 | 4/2005 | Smith et al. | 560/26 |
| 6,903,179 | B2 | 6/2005 | Lawrey | 528/61 |
| 6,958,379 | B2 | 10/2005 | Wu et al. | 528/64 |
| 6,960,630 | B2 | 11/2005 | Cavallaro et al. | 525/261 |
| 6,964,621 | B2 | 11/2005 | Bulpett et al. | 473/351 |
| 6,964,622 | B1 * | 11/2005 | Dewanjee | 473/375 |
| 7,030,192 | B2 | 4/2006 | Rajagopalan et al. | 525/261 |
| 7,041,769 | B2 | 5/2006 | Wu et al. | 528/61 |
| 7,105,623 | B2 | 9/2006 | Wu et al. | 528/64 |
| 7,131,915 | B2 | 11/2006 | Sullivan et al. | 473/376 |
| 7,186,777 | B2 | 3/2007 | Wu et al. | 524/765 |
| 7,402,629 | B2 | 7/2008 | Rajagopalan | 525/128 |
| 7,410,429 | B1 | 8/2008 | Bulpett et al. | 473/376 |
| 7,427,242 | B1 | 9/2008 | Sullivan et al. | 473/373 |
| 7,517,289 | B2 | 4/2009 | Sullivan et al. | 473/376 |
| 7,537,529 | B2 | 5/2009 | Bulpett et al. | 473/374 |
| 7,537,530 | B2 | 5/2009 | Bulpett et al. | 473/374 |
| 2002/0107354 | A1 | 8/2002 | Smith | 528/76 |
| 2003/0212240 | A1 * | 11/2003 | Wu et al. | 528/76 |
| 2004/0087754 | A1 * | 5/2004 | Foley et al. | 528/59 |
| 2004/0225102 | A1 | 11/2004 | Rajagopalan et al. | 528/61 |
| 2007/0049719 | A1 * | 3/2007 | Brauer et al. | 528/44 |
| 2008/0097068 | A1 | 4/2008 | Thiede et al. | 528/85 |
| 2012/0052983 | A1 * | 3/2012 | Tarao | 473/374 |

FOREIGN PATENT DOCUMENTS

JP     2002-263218     *  9/2002

OTHER PUBLICATIONS

Non-Final Office Action dated Nov. 29, 2012 of corresponding U.S. Appl. No. 12/975,491.
Notice of Allowance dated Mar. 27, 2013 of corresponding U.S. Appl. No. 12/975,491.
J. Dalton, "Compression by Any Other Name", Science and Golf IV, Proceedings of the World Scientific Congress of Golf (Eric Thain ed., Routledge, 2002).

* cited by examiner

*Primary Examiner* — David Buttner
(74) *Attorney, Agent, or Firm* — Smith, Gambrell & Russell, LLP

(57) ABSTRACT

Methods for making golf balls having a cover made from polyurea and polyurethane compositions are provided. The methods for making the polyurea and polyurethane composition involve preparing an amine-terminated or hydroxyl-terminated first prepolymer by reacting a first isocyanate compound with a stoichiometric excess of polyamine or polyol (depending on the type of prepolymer desired). The first prepolymer is then reacted with a stoichiometric excess of a second isocyanate compound to form an isocyanate-terminated second prepolymer. The second prepolymer is then reacted with a chain extender.

18 Claims, 5 Drawing Sheets

METHODS FOR MAKING POLYUREA AND POLYURETHANE POLYMERS AND GOLF BALLS PREPARED THEREFROM

CROSS-REFERENCE TO RELATED APPLICATIONS

This application is a continuation-in-part of U.S. patent application Ser. No. 13/941,749, filed Jul. 15, 2013, now U.S. Pat. No. 9,211,444, which is a continuation of U.S. patent application Ser. No. 12/975,491, filed Dec. 22, 2010, now U.S. Pat. No. 8,487,063, the entire disclosures of which are incorporated by reference.

BACKGROUND OF THE INVENTION

1. Field of the Invention

The present invention relates generally to methods for making polyurea, polyurea-urethane, and polyurethane polymer compositions that can be used to make a variety of products, particularly golf balls. The methods involve preparing intermediate prepolymers that are reacted with chain extenders to form final polymer compositions. The invention also encompasses products, particularly golf balls, which can be made with such polymers.

2. Brief Review of the Related Art

Polyurethane and polyurea polymer compositions are used in a wide variety of products including fibers, sporting goods, toys, coatings, sealants and adhesives, films and linings, and flexible and rigid foams. Polyurethanes or polyureas, which may be either thermoplastic or thermosetting, are used to make the products depending upon end-use application. In recent years, there has been high interest in using polyurethanes and polyureas to make cover materials for golf balls.

Basically, polyurethane compositions contain urethane linkages formed by reacting an isocyanate group (—N=C=O) with a hydroxyl group (OH). Polyurethanes are produced by the reaction of a multi-functional isocyanate with a polyol in the presence of a catalyst and other additives. The chain length of the polyurethane prepolymer is extended by reacting it with a hydroxyl chain extender (curative). Polyurea compositions, which are distinct from the above-described polyurethanes, also can be formed. In general, polyurea compositions contain urea linkages formed by reacting an isocyanate group (—N=C=O) with an amine group (—NH or —NH$_2$). The chain length of the polyurea prepolymer is extended by reacting the prepolymer with an amine chain extender (curative). Hybrid compositions containing urethane and urea linkages also may be produced. For example, a polyurea/urethane hybrid composition may be produced when a polyurea prepolymer is reacted with a hydroxyl-terminated curing agent.

In practice, two basic manufacturing techniques are used to form the polyurethane and polyurea compositions: a) one-shot technique, and b) prepolymer technique. For example, the one-shot technique, wherein the isocyanate and polyamine compounds and curing agent are reacted in one step, may be used to make polyureas. The isocyanate and polyamine compounds and curing agents along with additives, such as pigments, fillers, and/or light stabilizers, are mixed to form the final polyurea composition in a single reaction step. One example of a one-shot manufacturing process used for making polyurea or polyurethane materials such as flexible or rigid foams or plastic parts is known as reaction injection molding (RIM). In the RIM process, two highly reactive liquid streams are impinged and mixed together at high pressure and the reaction mixture is rapidly injected into a mold cavity. The two streams may be referred to as a polyurea or polyurethane system. The first stream containing the isocyanate compounds may be referred to as the "A" component and the second stream containing the polyamines and/or polyols and additives may be referred to as the "B" component.

The second technique, prepolymer manufacturing, involves multiple reaction steps. In a conventional prepolymer process, the isocyanate and polyamine compounds are mixed together at an excess stoichiometric ratio of isocyanate groups to amine groups, and the mixture is heated to produce an isocyanate-terminated prepolymer. In turn, the prepolymer is reacted with an amine or hydroxyl-terminated curing agent (chain extender). In this reaction, the chain extender reacts with the residual NCO groups in the prepolymer to form the polyurea or polyurethane. Such conventional prepolymer manufacturing techniques are described in the patent literature.

For example, Turner et al., U.S. Pat. No. 4,686,242 discloses a process for preparing a polyurea or polyurea-urethane polymer that involves reacting an amine functional compound having an equivalent weight of at least about 400 with an excess of polyisocyanate to form an isocyanate-terminated prepolymer or quasi-prepolymer. In the next step, the isocyanate-terminated prepolymer or quasi-prepolymer is reacted with an isocyanate reactive material, preferably a low molecular weight polyamine or polyol, to form a polyurea and/or polyurea-urethane polymer that preferably has a non-cellular or microcellular structure.

Smith, U.S. Patent Application Publication 2002/107354, discloses a process for making a polyurea prepolymer, whereby a polyamine and caprolactone monomer are reacted to provide an open chain, linear aliphatic reaction product with a functional, terminal amine group at one end and a functional hydroxy group at the other end. The reaction product is reacted with aliphatic polyisocyanate, whereby the polyisocyanate reacts with each of the end groups to provide an aliphatic polyurea prepolymer.

Thiede, U.S. Patent Application Publication 2008/0097068, discloses a process for making an isocyanate-terminated prepolymer involving the steps of reacting a polycaprolactone polyol with a stoichiometric excess of an isocyanate mixture that contains at least 60 weight percent methylene diphenylisocyanate (MDI). The MDI comprises the 2,4'- and 4,4'-methylene diphenylisocyanate isomer in a molar ratio of from 25:75 to 80:20.

Today, the golf industry is developing cover layers for golf balls using castable, thermoset polyurethanes and polyureas. For example, multi-piece golf balls comprising a core, inner cover layer, and outer cover layer are used by many golf players today. The core is made commonly of a rubber material such as natural and synthetic rubbers, styrene butadiene, polybutadiene, poly(cis-isoprene), or poly(trans-isoprene). The inner cover layer may be made of a relatively hard material having a high flexural modulus such as ethylene-based ionomer resins. These ionomer acid copolymers contain inter-chain ionic bonding and are generally made of ethylene and a vinyl comonomer having an acid group such as methacrylic acid, acrylic acid, or maleic acid. Metal ions such as sodium, lithium, zinc, and/or magnesium are used to neutralize the acid groups in the copolymer. Ethylene-based ionomer resins are available in various grades and identified based on the type of base resin, molecular weight, type of metal ion, amount of acid, degree of neutralization, additives, and other properties.

The relatively hard inner cover provides the ball with good resiliency allowing the balls to reach a high speed when struck by a club. As a result, such golf balls tend to travel a greater distance, which is particularly important for driver shots off the tee and shots made with long irons. Meanwhile, the relative softness of the cover provides the player with a better "feel" when he/she strikes the ball with the club face. The player senses more control over the ball as the club face makes impact with the ball. Such softer covered balls tend to have better playability. The softer cover allows players to place a spin on the ball and better control its flight pattern. This is particularly important for approach shots near the green. Polyurethane and polyurea covered golf balls are described in the patent literature, for example, U.S. Pat. Nos. 5,334,673; 5,484,870; 6,476,176; 6,506,851; 6,867,279; 6,958,379; 6,960,630; 6,964,621; 7,041,769; 7,105,623; 7,131,915; and 7,186,777.

As discussed above, in the traditional prepolymer process, the isocyanate-terminated prepolymer is formed using a stoichiometric excess of isocyanate to polyols/polyamines so that all of the hydroxyl/amine groups will react with the isocyanate groups. One potential disadvantage with using conventional techniques to make an isocyanate-terminated prepolymer is that a high concentration of free isocyanate may be produced in the process. If a significant amount of residual isocyanate is generated, this may lead to potential environmental, health and safety issues.

Another potential disadvantage with conventional prepolymer manufacturing processes is that it may be difficult to use certain combinations of isocyanates, polyamines, and curing agents. Different isocyanate compounds may have significantly different reaction rates with polyamines and curing agents making it difficult to use isocyanate blends. Also, certain isocyanates may not be compatible with certain polyamines and curing agents. Furthermore, it can be difficult to handle and work with certain isocyanate compounds such as toluene diisocyanate (TDI), because of their relatively high vapor pressures and potential health and safety risks.

One objective of this invention is to develop a novel method for forming prepolymers so that manufacturers can use different combinations of isocyanate compounds, polyamines/polyols, and chain extenders in the formulations. Secondly, when polyurea and polyurethane compositions are used as cover materials for golf balls, the properties of the composition depend in significant part upon the components or building blocks used to make the compositions, particularly the isocyanates, polyamines/polyols, and curing agents. Prepolymers that can provide the final polyurea and polyurethane polymer compositions with desirable properties such as high tensile strength, flex modulus, impact durability, and cut/tear-resistance along with other advantageous properties would be of great benefit. One objective of this invention is to develop such prepolymers that can be used in turn to make polyurea and polyurethane polymer compositions having optimum properties. The present invention provides novel prepolymers having many advantageous properties, features, and benefits along with novel methods for making such prepolymers.

SUMMARY OF THE INVENTION

The present invention is directed generally to methods for making polyurea and polyurethane polymer compositions. In one aspect, the method involves preparing an amine-terminated first prepolymer by reacting isocyanate compound "A" with a stoichiometric excess of polyamine. The first prepolymer is then reacted with a stoichiometric excess of isocyanate compound "B" to form an isocyanate-terminated second prepolymer. The second prepolymer is reacted with a chain extender or mixture of chain extenders selected from amine-terminated compounds. The isocyanate compounds "A" and "B" can be the same or different materials. For example, isocyanate compound "A" can be 4,4'-dicyclohexylmethane diisocyanate ($H_{12}$MDI) and isocyanate compound "B" can be 1,6-hexamethylene diisocyanate (HDI) oligomers. In another version, isocyanate compound "A" is 2,4-toluene diisocyanate (TDI) and isocyanate compound "B" is 4,4'-diphenylmethane diisocyanate (MDI).

In another version, the method involves preparing a hydroxyl-terminated first prepolymer by reacting isocyanate compound "A" with a stoichiometric excess of polyol. The first prepolymer is then reacted with a stoichiometric excess of isocyanate compound "B" to form an isocyanate-terminated second prepolymer. The second prepolymer is reacted with a chain extender or mixture of chain extenders selected from hydroxyl-terminated compounds. The isocyanate compounds "A" and "B" can be the same or different materials.

The polymer compositions can be used in different products and are particularly suitable for making golf balls. The polymer compositions can help impart desirable properties such as high tensile strength, flex modulus, impact durability, cut/tear-resistance to the golf balls. In one embodiment, the polymer composition is used to make a cover for a golf ball.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
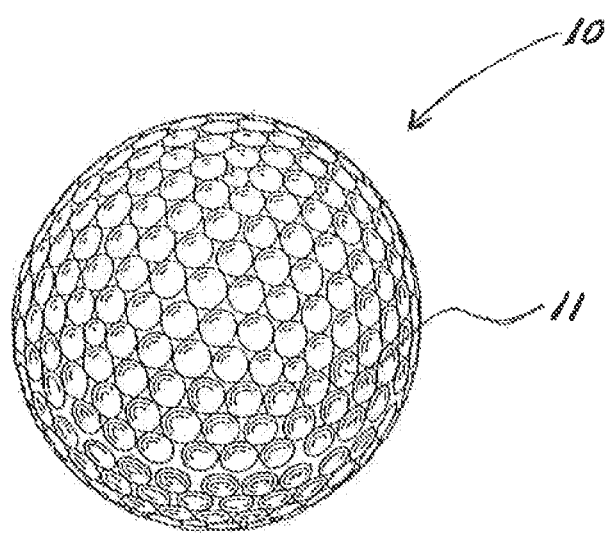
FIG. 1 is a front view of a dimpled golf ball made in accordance with the present invention.

The present invention provides different methods for making polyurea and polyurethane polymer compositions for use in a variety of products, particularly golf balls. By the term, "polymer" as used herein, it is meant a large molecule (macromolecule) composed of repeating structural units typically connected by covalent chemical bonds. The term, "polymer" as used herein refers to, but is not limited to, oligomers, homopolymers, copolymers, and mixtures thereof. By the term, "prepolymer" as used herein, it is meant a polymer of relatively low to medium molecular weight that is normally the intermediate material between a monomer and final polymer, and which may be further polymerized by reaction with cross-linking agents or chain extenders. By the term, "isocyanate compound" as used herein, it is meant any aliphatic or aromatic isocyanate containing two or more isocyanate functional groups. The isocyanate compounds can be monomers or monomeric units, because they can be polymerized to produce polymeric isocyanates containing two or more monomeric isocyanate repeat units. The isocyanate compound may have any suitable backbone chain structure including saturated or unsaturated, and linear, branched, or cyclic. By the term, "polyamine" as used herein, it is meant any aliphatic or aromatic compound containing two or more primary or secondary amine functional groups. The polyamine compound may have any suitable backbone chain structure including saturated or unsaturated, and linear, branched, or cyclic. The term "polyamine" may be used interchangeably with amine-terminated component. By the term, "polyol" as used herein, it is meant any aliphatic or aromatic compound containing two or more hydroxyl functional groups. The term "polyol" may be used interchangeably with hydroxy-terminated component.

Polyurea Composition

First Prepolymer

In one embodiment, the method of this invention involves preparing an amine-terminated first prepolymer by reacting isocyanate compound "A" with a stoichiometric excess of polyamine compound. The resulting amine-terminated prepolymer contains some unreacted functional (amine) groups. By the term, "equivalent weight," it is meant the molecular weight of a compound divided by the number of reactive (functional) groups in that compound. For example, the molecular weight of pure toluene diisocyanate (TDI) is 174, and it has two isocyanate functional groups. Therefore, the equivalent weight of TDI is 174/2 or 87. By the term, "equivalent" it is meant the number of moles of a functional group in a given quantity of material, and it is calculated by dividing the material weight by the equivalent weight. In a traditional isocyanate-terminated prepolymer formulation, the number of equivalents of isocyanate groups is greater than the number of equivalents of amine groups. That is, there is a stoichiometric excess of isocyanate groups. The number of equivalents of isocyanate groups and amine groups is not balanced.

In one embodiment of the method of this invention, the first step involves preparing an amine-terminated prepolymer by reacting isocyanate compound "A" with a stoichiometric excess of polyamine. That is, the number of equivalents of amine groups is greater than the number of equivalents of isocyanate groups. In a preferred embodiment, for every 1.00 equivalents of amine groups, there are 0.05 to 0.40 equivalents of isocyanate groups. Thus, the equivalent ratio of NH or $NH_2$ groups of the polyamine to NCO groups of the polyisocyanate is in the range of 20:1 to 2.5:1. That is, there are 2.5 to 20× more amine equivalents to isocyanate equivalents. It should be recognized that in order to reduce the amount of free amine groups in the mixture sufficiently, it may be necessary to use conventional removal techniques such as distillation, solvent-aided stripping, and the like. Particularly, such removal techniques may be needed to reach a ratio of amine groups to isocyanate groups of 2.5:1.

In one preferred embodiment, the isocyanate compound is added to a reaction vessel containing a stoichiometric excess of polyamine under agitation. The reaction temperature typically is in the range of 20° C. to 175° C., more preferably 35° C. to 85° C. The reaction of the isocyanate compound with the stoichiometric excess of polyamine proceeds quickly. Because of this rapid reaction, a relatively high molecular weight amine-terminated prepolymer may be formed. The isocyanate compound is end-capped with the diamine. In addition to the amine end-capped prepolymer, there is excess diamine. The reaction is conducted until substantially all of the isocyanate groups of the isocyanate compound have reacted with the amine groups of the amine compound. The speed of the reaction may be slowed down by adding the isocyanate compound gradually. This will help minimize the production of higher molecular weight materials. The reaction can be performed in a moisture-free atmosphere. Alternatively, water can be added to the reaction. Adding water will increase the urea content of the prepolymer as the water will react with the free isocyanate groups to produce carbamic acid. In turn, the relatively unstable carbamic acid decomposes to form carbon dioxide and an amine. The amine then reacts with the isocyanate groups to produce additional urea linkages. Surfactants may be added to the reaction mixture to control formation of bubbles. Suitable isocyanate compounds and polyamines that can be used to make the first prepolymer are described in further detail below. The resulting amine-terminated prepolymer can be used to prepare a second prepolymer as discussed below.

Second Prepolymer

Next, the amine-terminated prepolymer can be reacted with a stoichiometric excess of isocyanate compound B to form a second prepolymer. The resulting isocyanate-terminated prepolymer will contain some unreacted functional (isocyanate) groups. Preferably, the prepolymer has less than 14% unreacted functional groups, more preferably no greater than 8.5% unreacted functional groups, most preferably 0.5 to 8% unreacted functional groups.

In one preferred embodiment, the amine-terminated prepolymer along with any excess polyamine produced from the first reaction is added to a reaction vessel containing a stoichiometric excess of isocyanate compound. The reaction temperature normally will be in the range of 20° C. to 175° C., more preferably 35° C. to 85° C. As in the case of the first reaction described above, the reaction between the amine-terminated prepolymer and isocyanate compound proceeds quickly. The reaction is conducted until substantially all of the amine groups of the amine-terminated prepolymer have reacted with the isocyanate groups of the isocyanate compound. In the reaction, the first prepolymer is end-capped with the isocyanate groups. The reaction produces an isocyanate-terminated prepolymer. In addition, excess isocyanate is present in the reaction vessel. The first and second prepolymers prepared by the method of this invention tend to have relatively low to medium molecular weight, normally in the range of 500 to 15,000 daltons and preferably in the range of 2,000 to 12,000 daltons.

The resulting isocyanate-terminated prepolymer (second prepolymer) may be reacted with a chain extender. In general, the prepolymer can be reacted with amine-terminated curing agents. Suitable chain extenders are described in more detail below. The chain extenders extend the chain length of the prepolymer and build-up its molecular weight. The resulting polyurea polymer has good elastomeric properties, because of its "hard" and "soft" segments, which are covalently bonded together. The soft, amorphous, low-melting point segments, which are formed from the polyamines, are relatively flexible and mobile, while the hard, high-melting point segments, which are formed from the isocyanate and chain extenders, are relatively stiff and immobile. The phase separation of the hard and soft segments provides the polyurea polymer with its elastomeric resiliency.

In the method of the present invention, as described above, the isocyanate compound A is slowly added to the stoichiometric excess of polyamine, thus creating a modified soft segment with higher molecular weight. This first prepolymer (or modified soft segment) is slowly added to isocyanate compound "B," which is present in stoichiometric excess, to form the second prepolymer. Finally, the second prepolymer is reacted with chain extenders to provide cross-linked and hard segments in the final polymer composition. It is believed that by forming modified soft segments and hard segments in this manner produces a final polyurea composition having uniform distribution of soft and hard segments. The distribution and phase separation of soft and hard segments obtained by following the method of this invention helps impart desirable physical properties to the polymer composition. This two-step prepolymer process provides better control of the chemical reaction. A more homogeneous mixture resulting in a more consistent final polymer composition is achieved.

Particularly, as discussed further below, the resulting polyurea composition may be used to make golf balls having enhanced resiliency and impact durability along with a soft feel and good playability. The durability and toughness of the ball protects it from being cut, torn, and otherwise damaged. Such balls also will show good scuff/abrasion-resistance so they do not appear highly worn after repeated use. Furthermore, the high resiliency of the ball allows it to reach a higher velocity when struck by a golf club. As a result, the ball tends to travel a greater distance which is particularly important for driver shots off the tee. Meanwhile, the soft feel of the ball provides the player with a more pleasant sensation when he/she strikes the ball with the club.

Isocyanate Compounds

Any suitable isocyanate compound known in the art can be used to produce the polyurea polymer composition in accordance with this invention. Such isocyanates include, for example, aliphatic, cycloaliphatic, aromatic aliphatic, aromatic, any derivatives thereof, and combinations of these compounds having two or more isocyanate (—N═C═O) groups per molecule. The isocyanates may be organic polyisocyanate-terminated prepolymers, isocyanate prepolymers having a low residual amount of unreacted isocyanate monomer ("low free" isocyanates), and mixtures thereof. The isocyanate-containing reactable component also may include any isocyanate-functional monomer, dimer, trimer, or polymeric adduct thereof, prepolymer, quasi-prepolymer, or mixtures thereof. Isocyanate-functional compounds may include isocyanate monomers or polymers that include any isocyanate functionality of two or more.

Preferred isocyanates include diisocyanates (having two NCO groups per molecule), biurets thereof, dimerized uretdiones thereof, trimerized isocyanurates thereof, and polyfunctional isocyanates such as monomeric triisocyanates. Diisocyanates typically have the generic structure of OCN—R—NCO. Exemplary diisocyanates include, but are not limited to, unsaturated isocyanates such as: p-phenylene diisocyanate ("PPDI," i.e., 1,4-phenylene diisocyanate), m-phenylene diisocyanate ("MPDI," i.e., 1,3-phenylene diisocyanate), o-phenylene diisocyanate (i.e., 1,2-phenylene diisocyanate), 4-chloro-1,3-phenylene diisocyanate, toluene diisocyanate ("TDI"), m-tetramethylxylene diisocyanate ("m-TMXDI"), p-tetramethylxylene diisocyanate ("p-TMXDI"), 1,2-, 1,3-, and 1,4-xylene diisocyanates, 2,2'-, 2,4'-, and 4,4'-biphenylene diisocyanates, 3,3'-dimethyl-4,4'-biphenylene diisocyanate ("TODI"), 2,2'-, 2,4'-, and 4,4'-diphenylmethane diisocyanates ("MDI"), 3,3'-dimethyl-4,4'-diphenylmethane diisocyanate, carbodiimide-modified MDI, polyphenylene polymethylene polyisocyanate ("PMDI," i.e., polymeric MDI), 1,5-naphthalene diisocyanate ("NDI"), 1,5-tetrahydronaphththalene diisocyanate, anthracene diisocyanate, tetracene diisocyanate; and saturated isocyanates such as: 1,4-tetramethylene diisocyanate, 1,5-pentamethylene diisocyanate, 2-methyl-1,5-pentamethylene diisocyanate, 1,6-hexamethylene diisocyanate ("HDI") and isomers thereof, 2,2,4- and 2,4,4-trimethylhexamethylene diisocyanates, 1,7-heptamethylene diisocyanate and isomers thereof, 1,8-octamethylene diisocyanate and isomers thereof, 1,9-nonamethylene diisocyanate and isomers thereof, 1,10-decamethylene diisocyanate and isomers thereof, 1,12-dodecane diisocyanate and isomer thereof, 1,3-cyclobutane diisocyanate, 1,2-, 1,3-, and 1,4-cyclohexane diisocyanates, 2,4- and 2,6-methylcyclohexane diisocyanates, isophorone diisocyanate ("IPDI"), isocyanatomethylcyclohexane isocyanate, isocyanatoethylcyclohexane isocyanate, 4,4'-dicyclohexylmethane diisocyanate ("$H_{12}MDI$," i.e., bis(4-isocyanatocyclohexyl)-methane), and 2,4'- and 4,4'-dicyclohexane diisocyanates. Dimerized uretdiones of diisocyanates and polyisocyanates include, for example, unsaturated isocyanates such as uretdiones of toluene diisocyanates, uretdiones of diphenylmethane diisocyanates; and saturated isocyanates such as uretdiones of hexamethylene diisocyanates. Trimerized isocyanurates of diisocyanates and polyisocyanates include, for example, unsaturated isocyanates such as trimers of diphenylmethane diisocyanate, trimers of tetramethylxylene diisocyanate, isocyanurates of toluene diisocyanates; and saturated isocyanates such as isocyanurates of isophorone diisocyanate, isocyanurates of hexamethylene diisocyanate, isocyanurates of trimethyl-hexamethylene diisocyanates. Monomeric triisocyanates include, for example, unsaturated isocyanates such as 2,4,4'-diphenylene triisocyanate, 2,4,4'-diphenylmethane triisocyanate, 4,4',4''-triphenylmethane triisocyanate; and saturated isocyanates such as: 1,3,5-cyclohexane triisocyanate.

Preferably, each of the isocyanate compounds (A and B) is selected from the group consisting of: isophorone diisocyanate (IPDI); 1,6-hexamethylene diisocyanate (HDI); 1,4, cyclohexyl diisocyanate (CHDI); 4,4'-diisocyanatodicyclohexylmethane diisocyanate ($H_{12}MDI$); 4,4'-diphenylmethane diisocyanate (MDI); 2,4-toluene diisocyanate (TDI); 2,6-toluene diisocyanate; trimethyl hexamethylene diisocyanate (TMDI); 3,3'-dimethyl-4,4'-biphenyl diisocyanate (TODI; p-phenylene diisocyanate (PPDI); dodecane diisocyanate ($C_{12}DI$); m-tetramethylene xylene diisocyanate (TMXDI); 1,4-benzene diisocyanate; trans-cyclohexane-1,4-diisocyanate; 1,5-naphthalene diisocyanate (NDI); 4,6-xylyene diisocyanate (XDI); and mixtures thereof. The isocyanate compounds A and B may be the same or different compounds. The isocyanate compounds normally have a weight-average molecular weight in the range of about 100 to about 10,000 daltons.

For example, the isocyanate compound, 4,4'-diisocyanatodicyclohexylmethane diisocyanate ($H_{12}MDI$) reacts relatively slowly with many amine compounds. Because $H_{12}MDI$ reacts slowly with many polyamines, it is preferred that other isocyanate compounds be used in some instances. On the other hand, it is often desirable that $H_{12}MDI$ be used, because it is a good building block component. The $H_{12}MDI$ compound may be used to make polymer compositions having optimum physical properties such as mechanical strength and flexibility. In the present invention, $H_{12}MDI$ can be used with another isocyanate compound using the two-step prepolymer mechanism to make a polyurea polymer composition. Particularly, an amine-terminated first prepolymer may be prepared by reacting $H_{12}MDI$ (isocyanate compound A) with a stoichiometric excess of polyamine. This reaction causes the $H_{12}MDI$ to be end-capped with the diamine. The $H_{12}MDI$ becomes "tied-up" with the polyamine. This amine-terminated first prepolymer, along with the excess polyamine, then may be reacted with 1,6-hexamethylene diisocyanate (HDI)

(isocyanate compound B), a multi-functional isocyanate that reacts relatively quickly with many amine compounds. That, is the HDI compound has good reactivity. This second reaction causes the first prepolymer to be end-capped with the HDI, thus forming a second prepolymer having free isocyanate terminal groups. Finally, this isocyanate-terminated second polymer may be reacted with a chain extender to form the polyurea polymer composition. This final polymer composition is characterized by having good physical properties such as mechanical strength and flexibility that are imparted to the polymer by the $H_{12}MDI$ compound along with high reactivity that is imparted to the polymer by the HDI compound.

In a second example, it is desirable to use 2,4-toluene diisocyanate (TDI) in some instances, because it can form polyurea compositions having good thermal stability and mechanical strength. One disadvantage, however, with using TDI is that this compound has a relatively high vapor pressure and it can evaporate into work surroundings causing potential health and safety issues. In the present invention, TDI can be used with another isocyanate compound using the two-step prepolymer mechanism of this invention. Particularly, a first prepolymer may be prepared by reacting TDI (isocyanate compound A) with a stoichiometric excess of polyamine. This reaction causes the TDI to be end-capped with the diamine. The TDI becomes "tied-up" with the polyamine. Then, the amine-terminated first prepolymer, along with the excess polyamine, may be reacted with a second isocyanate compound (isocyanate compound B) having a lower vapor pressure than TDI. The resulting isocyanate-terminated second polymer may be reacted with a chain extender to form the polyurea polymer.

In the foregoing examples, isocyanate compounds A and B are described as being different chemical compounds. It should be recognized, however, that isocyanate compounds A and B can be the same or similar chemical compounds. For example, HDI dimer can be used as isocyanate compound A and HDI trimer can be used as isocyanate compound B to form an isocyanate-terminated prepolymer that can be reacted with a chain extender (curative) to form a final polymer composition.

Polyamine Compounds

Any suitable polyamine compound known in the art can be used to produce the polyurea polymer composition in accordance with this invention. Such polyamines include amine-terminated compounds, for example, amine-terminated hydrocarbons, polyethers, polyesters, polycarbonates, polycaprolactones, and mixtures thereof. The molecular weight of the amine compound is generally in the range of about 100 to about 10,000 daltons. Suitable polyether amines include, but are not limited to, methyldiethanolamine; polyoxyalkylenediamines such as, polytetramethylene ether diamines, polyoxypropylenetriamine, polyoxyethylene diamines, and polyoxypropylene diamines; poly(ethylene oxide capped oxypropylene) ether diamines; propylene oxide-based triamines; triethyleneglycoldiamines; glycerin-based triamines; and mixtures thereof. In one embodiment, the polyether amine used to form the prepolymer is Jeffamine D2000 (Huntsman Corp.). Additional amine-terminated compounds also may be useful in forming the polyurea prepolymers of the present invention including, but not limited to, poly(acrylonitrile-co-butadiene); poly(1,4-butanediol)bis(4-aminobenzoate) in liquid or waxy solid form; linear and branched polyethylene imine; low and high molecular weight polyethylene imine having an average molecular weight of about 500 to about 30,000; poly(propylene glycol)bis(2-aminopropyl ether) having an average molecular weight of about 200 to about 5000; polytetrahydrofuran bis(3-aminopropyl) terminated having an average molecular weight of about 200 to about 2000; and mixtures thereof. Preferably, the amine-terminated compound is a copolymer of polytetramethylene oxide and polypropylene oxide (Huntsman Corp.)

Chain-Extending Agents

The chain length of the isocyanate-terminated prepolymer may be extended by reacting it with a chain extender selected from the group consisting of amine-terminated chain extenders, hydroxyl-terminated chain extenders, and mixtures thereof. As discussed above, in general, urea linkages are formed by reacting an isocyanate group (—N═C═O) with an amine group (NH or $NH_2$). A polyurea polymer composition is produced when the polyurea prepolymer is chain extended using an amine-terminated compound. Suitable amine-terminated compounds that can be used to chain-extend the polyurea prepolymer are described in further detail below. The isocyanate groups in the prepolymer will react with the amine groups in the chain extender and create urea linkages. The resulting polyurea composition contains urea linkages having the following general structure:

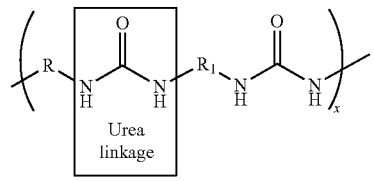

Urea linkage where x is the chain length, i.e., about 1 or greater, and R and $R_1$ are straight chain or branched organic chains. In one embodiment, a pure polyurea composition having urea linkages, as described above, is prepared. That is, the composition contains only urea linkages.

The polyurea compositions of this invention may contain additives, ingredients, and other materials that do not detract from the properties of the final composition. These additional materials include, but are not limited to, catalysts, wetting agents, coloring agents, optical brighteners, cross-linking agents, whitening agents such as titanium dioxide and zinc oxide, ultraviolet (UV) light absorbers, hindered amine light stabilizers, defoaming agents, processing aids, surfactants, and other conventional additives. For example, wetting additives may be added to more effectively disperse the pigments. Other suitable additives include antioxidants, stabilizers, softening agents, plasticizers, including internal and external plasticizers, impact modifiers, foaming agents, density-adjusting fillers, reinforcing materials, compatibilizers, and the like. Density-adjusting fillers can be added to modify the modulus, tensile strength, and other properties of the compositions. Examples of useful fillers include zinc oxide, zinc sulfate, barium carbonate, barium sulfate, calcium oxide, calcium carbonate, clay, tungsten, tungsten carbide, silica, and mixtures thereof. Regrind (recycled core material) high-Mooney-viscosity rubber regrind, and polymeric, ceramic, metal, and glass microspheres also may be used. Generally, the additives will be present in the composition in an amount between about 1 and about 75 weight percent based on total weight of the composition depending upon the desired properties.

Since the amine groups react so rapidly with the isocyanate groups, it is not necessary to use a catalyst in the reaction system. However, if desirable, a catalyst may be employed to promote the reaction between the isocyanate and polyamine compounds for producing the prepolymers or between the prepolymer and chain extenders during the chain-extending step. Suitable catalysts include, but are not limited to, bismuth catalyst; zinc octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.05 to 0.5 percent, by weight of the composition.

Suitable amine chain-extending (curing) agents that can be used in chain-extending the polyurea prepolymer of this invention include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-)toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl-4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenylmethane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"), 4,4'-bis(sec-butylamino)-diphenylmethane, N,N'-dialkylamino-diphenylmethane, trimethyleneglycol-di (p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methylimino-bis(propylamine) (i.e., N-(3-aminopropyl)-N-methyl-1,3-propanediamine), 1,4-bis(3-aminopropoxy)butane (i.e., 3,3'-[1,4-butanediylbis-(oxy)bis]-1-propanamine), diethyleneglycol-bis(propylamine) (i.e., diethyleneglycol-di (aminopropyl)ether), 4,7,10-trioxatridecane-1,13-diamine, 1-methyl-2,6-diamino-cyclohexane, 1,4-diamino-cyclohexane, poly(oxyethylene-oxypropylene)diamines, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, 3,3'-diethyl-5,5'-dichloro-4,4'-diamino-dicyclohexylmethane, polytetramethylene ether diamines, 3,3',5,5'-tetraethyl-4,4'-diamino-dicyclohexyl-methane (i.e., 4,4'-methylene-bis(2,6-diethylaminocyclohexane)), 3,3'-dichloro-4,4'-diamino-dicyclohexylmethane, 2,2'-dichloro-3,3',5,5'-tetraethyl-4,4'-diamino-dicyclohexyl-methane, (ethylene oxide)-capped polyoxypropylene ether diamines, 2,2',3,3'-tetrachloro-4,4'-diamino-dicyclohexyl-methane, 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine (i.e., $N_3$-amine), glycerin-based triamines, (all saturated); tetramines such as N,N'-bis(3-aminopropyl)ethylene diamine (i.e., $N_4$-amine) (both saturated), triethylene tetramine; and other polyamines such as tetraethylene pentamine (also saturated). One suitable amine-terminated chain-extending agent is Ethacure 300™ (dimethylthiotoluenediamine or a mixture of 2,6-diamino-3,5-dimethylthiotoluene and 2,4-diamino-3,5-dimethylthiotoluene.) The amine curing agents used as chain extenders normally have a cyclic structure and a low molecular weight (for example, 1000 daltons or less).

Polyurethane Composition

First Prepolymer

In another embodiment, the method of this invention involves preparing a hydroxyl-terminated first prepolymer by reacting isocyanate compound "A" with a stoichiometric excess of polyol compound. The resulting hydroxyl-terminated prepolymer contains some unreacted functional groups. By the term, "equivalent weight," it is meant the molecular weight of a compound divided by the number of reactive (functional) groups in that compound. For example, the molecular weight of pure toluene diisocyanate (TDI) is 174, and it has two isocyanate functional groups. Therefore, the equivalent weight of TDI is 174/2 or 87. By the term, "equivalent" it is meant the number of moles of a functional group in a given quantity of material, and it is calculated by dividing the material weight by the equivalent weight. In a traditional isocyanate-terminated prepolymer formulation, the number of equivalents of isocyanate groups is greater than the number of equivalents of hydroxyl groups. That is, there is a stoichiometric excess of isocyanate groups. The number of equivalents of isocyanate groups and hydroxyl groups is not balanced.

The first step involves preparing a hydroxyl-terminated prepolymer by reacting isocyanate compound "A" with a stoichiometric excess of polyol. That is, the number of equivalents of hydroxyl groups is greater than the number of equivalents of isocyanate groups. In one embodiment, for every 1.00 equivalents of hydroxyl groups, there are about 0.05 to 0.40 equivalents of isocyanate groups. Thus, the equivalent ratio of OH groups of the polyol to NCO groups of the polyisocyanate is in the range of about 20:1 to 2.5:1. That is, there are about 2.5 to 20 times more hydroxyl equivalents to isocyanate equivalents. It should be recognized that in order to reduce the amount of free hydroxyl groups in the mixture sufficiently, it may be necessary to use conventional removal techniques such as distillation, solvent-aided stripping, and the like. Particularly, such removal techniques may be needed to reach a ratio of hydroxyl groups to isocyanate groups of about 2.5:1.

In one preferred embodiment, the isocyanate compound is added to a reaction vessel containing a stoichiometric excess of polyol under agitation. The reaction temperature typically is in the range of about 20° C. to about 175° C., more preferably about 35° C. to about 85° C. The isocyanate compound is end-capped with the hydroxyl groups. The reaction is conducted until substantially all of the isocyanate groups of the isocyanate compound have reacted with the hydroxyl groups of the polyol compound. The speed of the reaction may be slowed down by adding the isocyanate compound gradually. This will help minimize the production of higher molecular weight materials. The reaction can be performed in a moisture-free atmosphere. Alternatively, water can be added to the reaction. Surfactants may be added to the reaction mixture to control formation of bubbles. Suitable isocyanate compounds and polyols that can be used to make the first prepolymer are described in further detail below. The resulting hydroxyl-terminated prepolymer can be used to prepare a second prepolymer as discussed below.

Second Prepolymer

Next, the hydroxyl-terminated prepolymer can be reacted with a stoichiometric excess of isocyanate compound "B" to form a second prepolymer. The resulting isocyanate-terminated prepolymer will contain some unreacted functional (isocyanate) groups. Preferably, the prepolymer has less than 14% unreacted functional groups, more preferably no greater than 8.5% unreacted functional groups, most preferably 0.5 to 8% unreacted functional groups.

In one preferred embodiment, the hydroxyl-terminated prepolymer along with any excess polyol produced from the first reaction is added to a reaction vessel containing a stoichiometric excess of isocyanate compound. The reaction temperature normally will be in the range of about 20° C. to about 175° C., more preferably about 35° C. to about 85° C. The reaction is conducted until substantially all of the hydroxyl groups of the hydroxyl-terminated prepolymer have reacted with the isocyanate groups of the isocyanate compound. In the reaction, the first prepolymer is end-capped with the isocyanate groups. The reaction produces an isocyanate-terminated prepolymer. In addition, excess isocyanate is present in the reaction vessel. The first and second prepolymers prepared by one embodiment of the method of this invention tend to have relatively low to medium molecular weight, normally in the range of 500 to 15,000 daltons and preferably in the range of 2,000 to 12,000 daltons.

The resulting isocyanate-terminated prepolymer (second prepolymer) may be reacted with a chain extender. In general, the prepolymer can be reacted with hydroxyl-terminated curing agents. Suitable chain extenders are described in more detail below. The chain extenders extend the chain length of the prepolymer and build-up its molecular weight. The resulting polyurethane polymer has good elastomeric properties, because of its "hard" and "soft" segments, which are covalently bonded together. The soft, amorphous, low-melting point segments, which are formed from the polyols, are relatively flexible and mobile, while the hard, high-melting point segments, which are formed from the isocyanate and chain extenders, are relatively stiff and immobile. The phase separation of the hard and soft segments provides the polyurethane polymer with its elastomeric resiliency.

As described above, in one embodiment, the isocyanate compound A is slowly added to the stoichiometric excess of polyol, thus creating a modified soft segment with higher molecular weight. This first prepolymer (or modified soft segment) is slowly added to isocyanate compound B, which is present in stoichiometric excess, to form the second prepolymer. Finally, the second prepolymer is reacted with chain extenders to provide cross-linked and hard segments in the final polymer composition. It is believed that by forming modified soft segments and hard segments in this manner produces a final polyurethane composition having uniform distribution of soft and hard segments. The distribution and phase separation of soft and hard segments obtained by following the method of this invention helps impart desirable physical properties to the polymer composition. This two-step prepolymer process provides better control of the chemical reaction. A more homogeneous mixture resulting in a more consistent final polymer composition is achieved.

Particularly, as discussed further below, the resulting polyurethane composition may be used to make golf balls having enhanced resiliency and impact durability along with a soft feel and good playability. The durability and toughness of the ball protects it from being cut, torn, and otherwise damaged. Such balls also will show good scuff/abrasion-resistance so they do not appear highly worn after repeated use. Furthermore, the high resiliency of the ball allows it to reach a higher velocity when struck by a golf club. As a result, the ball tends to travel a greater distance which is particularly important for driver shots off the tee. Meanwhile, the soft feel of the ball provides the player with a more pleasant sensation when he/she strikes the ball with the club.

Isocyanate Compounds

Any suitable isocyanate compound known in the art can be used to produce the polyurethane polymer composition in accordance with this invention. Indeed, any of the isocyanate compounds discussed above with regard to the polyurea polymer composition are suitable for use in producing the polyurethane polymer composition in accordance with the invention.

Polyol Compounds

Any suitable polyol compound known in the art can be used to produce the polyurethane polymer composition in accordance with this invention. Such polyols include, for example, polyether polyols, polycaprolactone polyols, polyester polyols, polycarbonate polyols, hydrocarbon polyols, and mixtures thereof. Diols, triols, tetraols, and combinations thereof are contemplated for use with the invention.

Suitable saturated polyether polyols include, but are not limited to, polytetramethylene ether glycol (PTMEG); copolymer of polytetramethylene ether glycol and 2-methyl-1,4-butane diol (PTG-L); poly(oxyethylene)glycol; poly(oxypropylene)glycol; poly(ethylene oxide capped oxypropylene)glycol; and mixtures thereof.

Saturated polycaprolactone polyols include, but are not limited to, diethylene glycol initiated polycaprolactone; propylene glycol initiated polycaprolactone; 1,4-butanediol initiated polycaprolactone; trimethylol propane initiated polycaprolactone; neopentyl glycol initiated polycaprolactone; 1,6-hexanediol initiated polycaprolactone; polytetramethylene ether glycol (PTMEG) initiated polycaprolactone; ethylene glycol initiated polycaprolactone; dipropylene glycol initiated polycaprolactone; and mixtures thereof.

Suitable saturated polyester polyols include, but are not limited to, polyethylene adipate glycol; polyethylene propylene adipate glycol; polybutylene adipate glycol; polyethylene butylene adipate glycol; polyhexamethylene adipate glycol; polyhexamethylene butylene adipate glycol; and mixtures thereof.

Hydrocarbon polyols include, but are not limited to, hydroxy-terminated liquid isoprene rubber (LIR), hydroxy-terminated polybutadiene polyol, saturated hydroxy-terminated hydrocarbon polyols, and mixtures thereof. Other aliphatic polyols that may be used to form the prepolymer of the invention include, but not limited to, glycerols; castor oil and its derivatives; Kraton polyols; acrylic polyols; acid functionalized polyols based on a carboxylic, sulfonic, or phosphoric acid group; dimer alcohols converted from the saturated dimerized fatty acid; and mixtures thereof.

Chain-Extending Agents

The chain length of the isocyanate-terminated prepolymer may be extended by reacting it with a chain extender selected from the group consisting of hydroxyl-terminated chain extenders, amine-terminated chain extenders, and mixtures thereof. As discussed above, in general, urethane linkages are formed by reacting an isocyanate group (—N═C═O) with a hydroxyl group (OH). A polyurethane polymer composition is produced when the polyurethane prepolymer is chain extended using a hydroxyl-terminated compound. Suitable hydroxyl-terminated compounds that can be used to chain-extend the polyurethane prepolymer are described in further detail below. The isocyanate groups in the prepolymer will react with the hydroxyl groups in the chain extender and create urethane linkages. The resulting polyurethane composition contains urethane linkages having the following general structure:

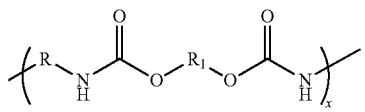

where x is the chain length, i.e., about 1 or greater, and R and $R_1$ are straight chain or branched organic chains. In one embodiment, a pure polyurethane composition having urethane linkages, as described above, is prepared. That is, the composition contains only urethane linkages.

The polyurethane compositions of this invention may contain additives, ingredients, and other materials that do not detract from the properties of the final composition. These additional materials include, but are not limited to, catalysts, wetting agents, coloring agents, optical brighteners, cross-linking agents, whitening agents such as titanium dioxide and zinc oxide, ultraviolet (UV) light absorbers, hindered amine light stabilizers, defoaming agents, processing aids, surfactants, and other conventional additives. For example, wetting additives may be added to more effectively disperse the pigments. Other suitable additives include antioxidants, stabilizers, softening agents, plasticizers, including internal and external plasticizers, impact modifiers, foaming agents, density-adjusting fillers, reinforcing materials, compatibilizers, and the like. Density-adjusting fillers can be added to modify the modulus, tensile strength, and other properties of the compositions. Examples of useful fillers include zinc oxide, zinc sulfate, barium carbonate, barium sulfate, calcium oxide, calcium carbonate, clay, tungsten, tungsten carbide, silica, and mixtures thereof. Regrind (recycled core material) high-Mooney-viscosity rubber regrind, and polymeric, ceramic, metal, and glass microspheres also may be used. Generally, the additives will be present in the composition in an amount between about 1 and about 75 weight percent based on total weight of the composition depending upon the desired properties.

A catalyst may be employed to promote the reaction between the isocyanate and polyol compounds for producing the prepolymers or between the prepolymer and chain extenders during the chain-extending step. Suitable catalysts include, but are not limited to, bismuth catalyst; zinc octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy] stannane, di-n-octyltin bis-isooctyl mercaptoacetate; amine catalysts such as triethylenediamine, triethylamine, and tributylamine; N,N-dimethylcyclohexylamine; a polyamine such as N,N,N',N'-tetramethylethylenediamine, and N,N,N',N'',N''-pentamethyldiethylenetriamine; a cyclic diamine such as 1,8-diazabicyclo-[5.4.0]-7-undecene (DBU), organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 5 percent, and preferably 0.05 to 1 percent, by weight of the composition.

Suitable hydroxyl chain-extending (curing) agents that can be used in chain-extending the polyurethane prepolymer of this invention include, but are not limited to, ethylene glycol; diethylene glycol; polyethylene glycol; propylene glycol; 2-methyl-1,3-propanediol; 2-methyl-1,4-butanediol; dipropylene glycol; polypropylene glycol; 1,2-butanediol; 1,3-butanediol; 1,4-butanediol, 2,3-butanediol; 2,3-dimethyl-2,3-butanediol; trimethylolpropane; cyclohexyldimethylol; triisopropanolamine; N,N,N'N'-tetra-(2-hydroxypropyl)-ethylene diamine; diethylene glycol bis-(aminopropyl)ether, 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 1,3-bis-{2-[2-(2-hydroxyethoxy)ethoxy]ethoxy}cyclohexane; polytetramethylene ether glycol; resorcinol-di-(beta-hydroxyethyl)ether and its derivatives; hydroquinone-di-(beta-hydroxyethyl)ether and its derivatives; 1,3-bis-(2-hydroxyethoxy)benzene; 1,3-bis-[2-(2-hydroxyethoxy)ethoxy] benzene; 1,3-bis-{2-[2-(2-hydroxyethoxy)ethoxy] ethoxy}benzene; N,N-bis(β-hydroxypropyl)aniline; 2-propanol-1,1'-phenylaminobis; and mixtures thereof.

Golf Ball Construction

The polyurea and polyurethane compositions of this invention may be used in golf balls. Multi-piece solid golf balls constituting different components or "layers" are used today by professional and recreational golfers. For example, three-piece solid golf balls having an inner core; a surrounding casing layer; and an outer cover are popular today. Various golf ball constructions are known in the art. Such golf ball constructions include, for example, two-piece, three-piece, four-piece, and five-piece balls. The polyurea and polyurethane compositions of this invention may be used with any type of ball construction. The present invention relates generally to golf balls containing at least one "layer" made from the polyurea and polyurethane compositions. The term, "layer" as used herein means generally any spherical portion of a golf ball. The polyurea and polyurethane compositions may be used to form any layer in the golf ball structure including, but not limited to, outer cover, inner cover, intermediate casing layer, and/or outer core layer. The cover, intermediate layer, and core can be single or multi-layered. The thickness and diameter of the different layers along with properties such as hardness and compression may vary depending upon the desired playing performance properties of the golf ball.

Figure 2:
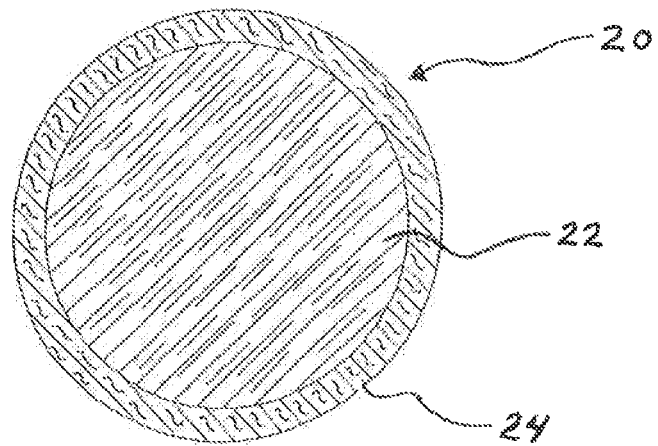
FIG. 2 is a cross-sectional view of a two-piece golf ball having a polyurea or polyurethane cover made in accordance with the present invention.
Figure 3:
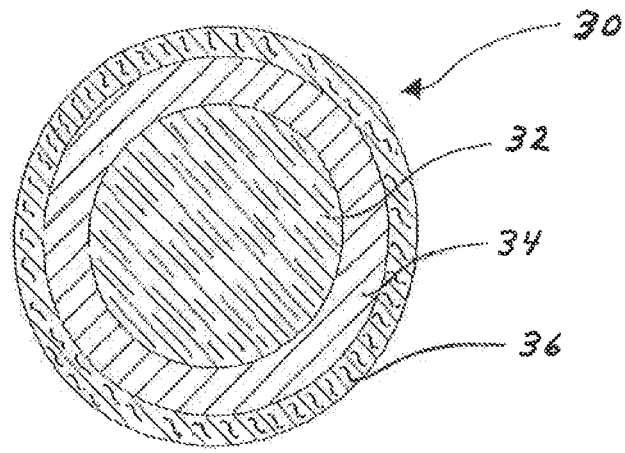
FIG. 3 is a cross-sectional view of a three-piece golf ball having a polyurea or polyurethane cover made in accordance with the present invention.

Referring to FIG. 1, one version of a golf ball that can be made in accordance with this invention is generally indicated at (10). Various patterns and geometric shapes of dimples (11) can be used to modify the aerodynamic properties of the golf ball (10). The dimples (11) can be arranged on the surface of the ball (10) using any suitable method known in the art. Referring to FIG. 2, a two-piece golf ball (20) that can be made in accordance with this invention is illustrated. In this version, the ball (20) includes a solid core (22) and polyurea or polyurethane cover (24). In FIG. 3, a three-piece golf ball (30) having a solid core (32), an intermediate layer (34), and polyurea or polyurethane cover (36) is shown.

Core

The core of the golf ball may be solid, semi-solid, fluid-filled, or hollow, and the core may have a single-piece or multi-piece structure. The cores in the golf balls of this invention are typically made from rubber compositions containing a base rubber, free-radical initiator agent, cross-linking co-agent, and fillers. The base rubber may be selected, for example, from polybutadiene rubber, polyisoprene rubber, natural rubber, ethylene-propylene rubber, ethylene-propylene diene rubber, styrene-butadiene rubber, and combinations of two or more thereof. A preferred base rubber is polybutadiene. Another preferred base rubber is polybutadiene optionally mixed with one or more elastomers such as polyisoprene rubber, natural rubber, ethylene propylene rubber, ethylene propylene diene rubber, styrene-butadiene rubber, polystyrene elastomers, polyethylene elastomers, polyurethane elastomers, polyurea elastomers, acrylate rubbers, polyoctenamers, metallocene-catalyzed elastomers, and plastomers. The base rubber typically is mixed with at least one reactive cross-linking co-agent to enhance the hardness of the rubber composition. Suitable co-agents include, but are not limited to, unsaturated carboxylic acids and salts and unsaturated vinyl compounds. Preferred unsaturated vinyl compounds include trimethylolpropane methacrylate (TMP) and zinc diacrylate (ZDA).

The rubber composition is cured using a conventional curing process. Suitable curing processes include, for example, peroxide curing, sulfur curing, high-energy radiation, and combinations thereof. In one embodiment, the base rubber is peroxide cured. Organic peroxides suitable as free-radical initiators include, for example, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. Cross-linking agents are used to cross-link at least a portion of the polymer chains in the composition. Suitable cross-linking agents include, for example, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. In a particular embodiment, the cross-linking agent is selected from zinc salts of acrylates, diacrylates, methacrylates, and dimethacrylates. In another particular embodiment, the cross-linking agent is zinc diacrylate ("ZDA"). Commercially available zinc diacrylates include those selected from Resource Innovation and Cray Valley.

The rubber compositions also may contain "soft and fast" agents such as a halogenated organosulfur, organic disulfide, or inorganic disulfide compounds. Particularly suitable halogenated organosulfur compounds include, but are not limited to, halogenated thiophenols. Preferred organic sulfur compounds include, but not limited to, pentachlorothiophenol ("PCTP") and a salt of PCTP. A preferred salt of PCTP is ZnPCTP. A suitable PCTP is sold by the Struktol Company (Stow, Ohio) under the tradename, "A95." The salt compound, ZnPCTP is commercially available from EchinaChem (San Francisco, Calif.). These compounds also may function as cis-to-trans catalysts to convert some cis-1, 4 bonds in the polybutadiene to trans-1, 4 bonds. Antioxidants also may be added to the rubber compositions to prevent the breakdown of the elastomers. Other ingredients such as accelerators (for example, tetra methylthiuram), processing aids, dyes and pigments, wetting agents, surfactants, plasticizers, as well as other additives known in the art may be added to the rubber composition. The core may be formed by mixing and forming the rubber composition using conventional techniques. These cores can be used to make finished golf balls by surrounding the core with outer core layer(s), intermediate layer(s), and/or cover materials as discussed further below. In another embodiment, the core can be formed using highly neutralized polymer (HNP) compositions as disclosed in U.S. Pat. Nos. 6,756,436, 7,030,192, 7,402,629, and 7,517,289. Furthermore, the cores from the highly neutralized polymer compositions can be further cross-linked using any suitable free-radical initiation sources including radiation sources such as gamma or electron beam as well as chemical sources such as peroxides and the like.

Figure 4:
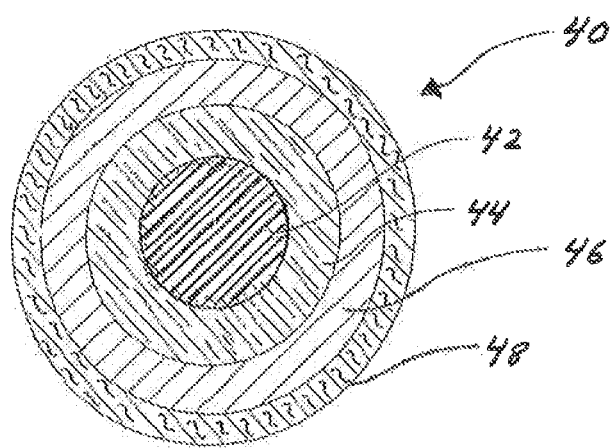
FIG. 4 is a cross-sectional view of a four-piece golf ball having a multi-layered core and a polyurea or polyurethane cover made in accordance with the present invention.

The core may contain sections having the same hardness or different hardness levels. That is, there can be uniform hardness throughout the different sections of the core or there can be hardness gradients across the layers. For example, in single cores, there may be a hard-to-soft gradient (a "positive" gradient) from the surface of the core to the geometric center of the core. In other instances, there may be a soft-to-hard gradient (a "negative" gradient) or zero hardness gradient from the core's surface to the core's center. For dual core golf balls, the inner core layer may have a surface hardness that is less than the geometric center hardness to define a first "negative" gradient. As discussed above, an outer core layer may be formed around the inner core layer, and the outer core layer may have an outer surface hardness less than its inner surface hardness to define a second "negative" gradient. In other versions, the hardness gradients from surface to center may be hard-to-soft ("positive"), or soft-to-hard ("negative"), or a combination of both gradients. In still other versions the hardness gradients from surface to center may be "zero" (that is, the hardness values are substantially the same.) Methods for making cores having positive, negative, and zero hardness gradients are known in the art as described in, for example, U.S. Pat. Nos. 7,537,530; 7,537,529; 7,427,242; and 7,410,429, the disclosures of which are hereby incorporated by Golf balls made in accordance with this invention can be of any size, although the USGA requires that golf balls used in competition have a diameter of at least 1.68 inches and a weight of no greater than 1.62 ounces. For play outside of USGA competition, the golf balls can have smaller diameters and be heavier. For example, the diameter of the golf ball may be in the range of about 1.68 to about 1.80 inches. In one embodiment, as shown in FIG. 2, the core is a single-piece having an outside diameter of about 1.00 to about 1.65 inches. Preferably, the single-piece core has a diameter of about 1.26 to about 1.60 inches. The core generally makes up a substantial portion of the ball, for example, the core may constitute at least about 90% of the ball. The hardness of the core may vary depending upon desired properties of the ball. In general, core hardness is in the range of about 10 to about 75 Shore D and more preferably in the range of about 30 to about 65 Shore D. The compression of the core is generally in the range of about 30 to about 110 and more preferably in the range of about 50 to about 100. In general, when the ball contains a relatively soft core, the resulting a driver spin rate of the ball is relatively low. On the other hand, when the ball contains a relatively hard core, the resulting spin rate of the ball is relatively high. In another embodiment, as shown in FIG. 4, the golf ball (40) contains a core made of two pieces. The inner core (42) is made of a first rubber composition as described above, while the outer core layer (44) is made of a second rubber composition. The first and second rubber compositions contain different ingredients. The golf ball further includes an intermediate casing layer (46) and a polyurea, polyurethane, or polyurea/urethane cover layer (48). Conventional thermoplastic or thermoset resins such as olefin-based ionomeric copolymers, polyamides, polyesters, polycarbonates, polyolefins, polyurethanes, and polyureas as described above can be used to make the casing layer (46).

In such multi-layered cores, the inner core (42) preferably has a diameter of about 0.50 to about 1.30 inches, more preferably 1.00 to 1.15 inches, and is relatively soft (that is, it may have a compression of less than about 30.) Meanwhile, the encapsulating outer core layer (44) generally has a thickness of about 0.030 to about 0.070 inches, preferably 0.035 to 0.065 inches and is relatively hard (compression of about 70 or greater.) The outer core layer (44) preferably has a Shore D surface hardness in the range of about 40 to about 70. That is, the two-piece core, which is made up of the inner core (42) and outer core layer (44), preferably has a total diameter of about 1.50 to about 1.64 inches, more preferably 1.510 to 1.620 inches, and a compression of about 80 to about 115, more preferably 85 to 110.

Intermediate Layer

Figure 5:
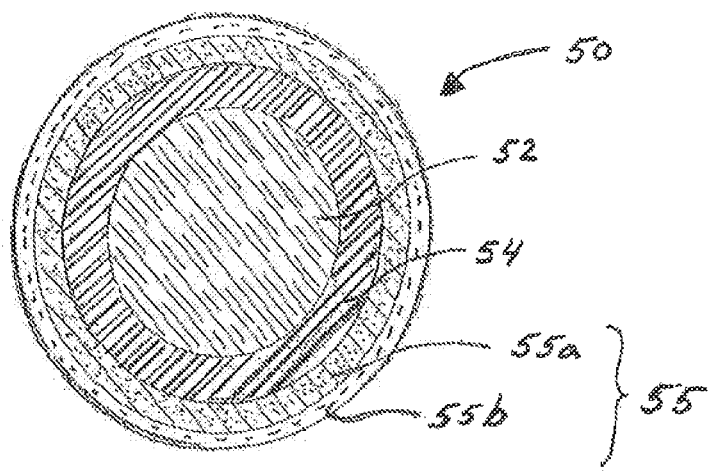
FIG. 5 is a cross-sectional view of a four-piece golf ball having a multi-layered polyurea or polyurethane cover made in accordance with the present invention.

The golf balls of this invention preferably include at least one intermediate layer. As used herein, the term, "intermediate layer" means a layer of the ball disposed between the core and cover. The intermediate layer may be considered an outer core layer or inner cover layer or any other layer disposed between the inner core and outer cover of the ball. The intermediate layer also may be referred to as a casing or mantle layer. The intermediate layer preferably has water vapor barrier properties to prevent moisture from penetrating into the rubber core. The ball may include one or more intermediate layers disposed between the inner core and outer cover. Referring to FIGS. 3-5, the golf balls are shown containing at least one intermediate casing layer positioned between the core and cover layers. The intermediate layer may be made of any suitable material known in the art including thermoplastic and thermosetting materials.

Suitable thermoplastic compositions for forming the intermediate core layer include, but are not limited to, partially- and fully-neutralized ionomers, particularly olefin-based ionomer copolymers such as ethylene and a vinyl comonomer having an acid group such as methacrylic, acrylic acid, or maleic acid; graft copolymers of ionomer and polyamide, and the following non-ionomeric polymers: polyesters; polyamides; polyamide-ethers, and polyamide-esters; polyurethanes, polyureas, and polyurethane-polyurea hybrids; fluoropolymers; non-ionomeric acid polymers, such as E/Y- and E/X/Y-type copolymers, wherein E is an olefin (e.g., ethylene), Y is a carboxylic acid, and X is a softening comonomer such as vinyl esters of aliphatic carboxylic acids, and alkyl alkylacrylates; metallocene-catalyzed polymers; polystyrenes; polypropylenes and polyethylenes; polyvinyl chlorides and grafted polyvinyl chlorides; polyvinyl acetates; polycarbonates including polycarbonate/acrylonitrile-butadiene-styrene blends, polycarbonate/polyurethane blends, and polycarbonate/polyester blends; polyvinyl alcohols; polyethers; polyimides, polyetherketones, polyamideimides; and mixtures of any two or more of the above thermoplastic polymers. The olefin-based ionomer resins are copolymers of olefin (for example, ethylene) and α,β-ethylenically unsaturated carboxylic acid (for example, acrylic acid or methacrylic acid) that normally have 10% to 100% of the carboxylic acid groups neutralized by metal cations.

Examples of commercially available thermoplastics suitable for forming the intermediate core layer include, but are not limited to, Pebax® thermoplastic polyether block amides, commercially available from Arkema Inc.; Surlyn® ionomer resins, Hytrel® thermoplastic polyester elastomers, and ionomeric materials sold under the trade names DuPont HPF 1000® and HPF 2000®, all of which are commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; Clarix® ionomer resins, commercially available from A. Schulman Inc.; Elastollan® polyurethane-based thermoplastic elastomers, commercially available from BASF; and Xylex® polycarbonate/polyester blends, commercially available from SABIC Innovative Plastics. The above-mentioned filler materials may be added to the intermediate layer composition to modify such properties as the specific gravity, density, hardness, weight, modulus, resiliency, compression, and the like.

Olefin-based ionomers, such as ethylene-based copolymers, normally include an unsaturated carboxylic acid such as methacrylic acid, acrylic acid, or maleic acid. Other possible carboxylic acid groups include, for example, crotonic, maleic, fumaric, and itaconic acid. "Low acid" and "high acid" olefin-based ionomers, as well as blends of such ionomers, may be used. In general, low acid ionomers are considered to be those containing 16 wt. % or less of carboxylic acid, whereas high acid ionomers are considered to be those containing greater than 16 wt. % of carboxylic acid. The acidic group in the olefin-based ionic copolymer is partially or totally neutralized with metal ions such as zinc, sodium, lithium, magnesium, potassium, calcium, manganese, nickel, chromium, copper, or a combination thereof. For example, ionomeric resins having carboxylic acid groups that are neutralized from about 10 percent to about 100 percent may be used. In one embodiment, the acid groups are partially neutralized. That is, the neutralization level is from 10 to 80%, more preferably 20 to 70%, and most preferably 30 to 50%. In another embodiment, the acid groups are highly or fully neutralized. That is, the neutralization level is from 80 to 100%, more preferably 90 to 100%, and most preferably 95 to 100%. In one embodiment, the blend may contain about 10 to about 90% by weight of the polyurea and about 90 to about 10% by weight of a partially, highly, or fully-neutralized olefin-based ionomeric copolymer. Particularly, the blend may contain a lower concentration of polyurea in the amount of 10%, 20%, 30%, 40%, or 50% and an upper concentration of polyurea in the amount of 60%, 70%, 80%, or 90%. Conversely, the concentration of non-ionomeric polymer may be relatively high (60%, 70%, 80%, or 90%) or relatively low (10%, 20%, 30%, 40%, or 50%). In another embodiment, the blend may contain about 10 to about 90% by weight of the polyurethane and about 90 to about 10% by weight of a partially, highly, or fully-neutralized olefin-based ionomeric copolymer. Particularly, the blend may contain a lower concentration of polyurethane in the amount of 10%, 20%, 30%, 40%, or 50% and an upper concentration of polyurethane in the amount of 60%, 70%, 80%, or 90%. Conversely, the concentration of non-ionomeric polymer may be relatively high (60%, 70%, 80%, or 90%) or relatively low (10%, 20%, 30%, 40%, or 50%). The above-mentioned blends may contain one or more suitable compatibilizers such as glycidyl acrylate or glycidyl methacrylate or maleic anhydride containing-polymers.

The olefin-based ionomeric resins may be blended with non-ionomeric thermoplastic resins. Examples of suitable non-ionomeric thermoplastic resins include, but are not limited to, polyurethane, poly-ether-ester, poly-amide-ether, polyether-urea, thermoplastic polyether block amides (e.g., Pebax® block copolymers, commercially available from Arkema Inc.), styrene-butadiene-styrene block copolymers, styrene(ethylene-butylene)-styrene block copolymers, polyamides, polyesters, polyolefins (e.g., polyethylene, polypropylene, ethylene-propylene copolymers, polyethylene-(meth)acrylate, polyethylene-(meth)acrylic acid, functionalized polymers with maleic anhydride grafting, Fusabond® functionalized polymers commercially available from E. I. du Pont de Nemours and Company, functionalized polymers with epoxidation, elastomers (e.g., ethylene propylene diene monomer rubber, metallocene-catalyzed polyolefin) and ground powders of thermoset elastomers.

That is, the polyureas and polyurethanes of this invention may be blended with non-ionomeric and olefin-based ionomeric copolymers to form the composition that will be used to make the golf ball layer. As mentioned above, examples of non-ionomeric polymers include vinyl resins, polyolefins including those produced using a single-site catalyst or a metallocene catalyst, polyurethanes, polyureas, polyamides, polyphenylenes, polycarbonates, polyesters, polyacrylates, engineering thermoplastics, and the like. In one embodiment, the blend may contain about 10 to about 90% by weight of the polyurea and about 90 to about 10% by weight of non-ionomeric and olefin-based ionomeric polymers. Particularly, the blend may contain a lower concentration of polyurea, for example, in the amount of 10%, 20%, 30%, 40%, or 50% and an upper concentration of polyurea, for example, in the amount of 60%, 70%, 80%, or 90%. Conversely, the concentration of non-ionomeric and/or ionomeric polymers may be relatively high (for example, 60%, 70%, 80%, or 90%) or relatively low (for example, 10%, 20%, 30%, 40%, or 50%.) In another embodiment, the blend may contain about 10 to about 90% by weight of the polyurethane and about 90 to about 10% by weight of non-ionomeric and olefin-based ionomeric polymers. Particularly, the blend may contain a lower concentration of polyurethane, for example, in the amount of 10%, 20%, 30%, 40%, or 50% and an upper concentration of polyurethane, for example, in the amount of 60%, 70%, 80%, or 90%. Conversely, the concentration of non-ionomeric and/or ionomeric polymers may be relatively high (for example, 60%, 70%, 80%, or 90%) or relatively low (for example, 10%, 20%, 30%, 40%, or 50%).

Cover Layer

Figure 6:
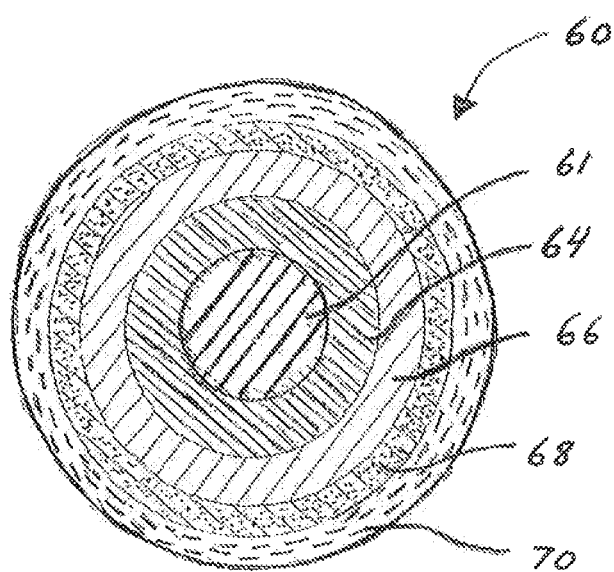
FIG. 6 is a cross-sectional view of a five-piece golf ball having a multi-layered polyurea or polyurethane cover made in accordance with the present invention.

Turning to FIG. 5, a four-piece golf ball (50) having a multi-layered cover is shown. The ball (50) includes a solid, one-piece rubber core (52), an intermediate layer (54), and multi-layered cover (55) constituting an inner cover layer (55a) and outer cover layer (55b). In this version, the inner cover layer (55a) is made of a conventional thermoplastic or thermosetting resin. For example, the inner cover (55a) may be made of polyurethane, polyurea, ionomer resin or any of the other cover materials described above. The inner cover (55a) preferably has a thickness of about 0.020 to about 0.050 inches and Shore D material hardness of about 50 to about 70. The outer cover layer (55a), which surrounds the inner cover layer (55b), is made of the polyurea, polyurea/urethane, or polyurethane composition of this invention. The outer cover layer (55b) preferably has a thickness in the range of about 0.020 to about 0.035 inches and a Shore D material hardness in the range of about 45 to about 65. In another embodiment, a five-piece ball may be made. For example, in FIG. 6, a five-piece golf ball (60) having a cover with three-layers is shown. The ball includes a solid, rubber center (61), an outer core layer (64), and multi-layered cover constituting an inner cover layer (66), intermediate cover layer (68) and outer cover layer (70). In this version, the inner and intermediate cover layers (66, 68) are made of conventional thermoplastic or thermosetting resins and the outer cover layer (70) is made of the polyurea or polyurethane composition of this invention.

It should be understood that the golf ball constructions shown in FIGS. 1-6 are for illustrative purposes only and are not meant to be restrictive. A wide variety of golf ball constructions may be made in accordance with the present invention depending upon the desired properties of the ball so long as at least one layer contains the polyurea, polyurea/urethane, or polyurethane composition of this invention. As discussed above, such constructions include, but are not limited to, three-piece, four-piece, and five-piece designs and the cores, intermediate layers, and/or covers may be single or multilayered.

Figure 7:
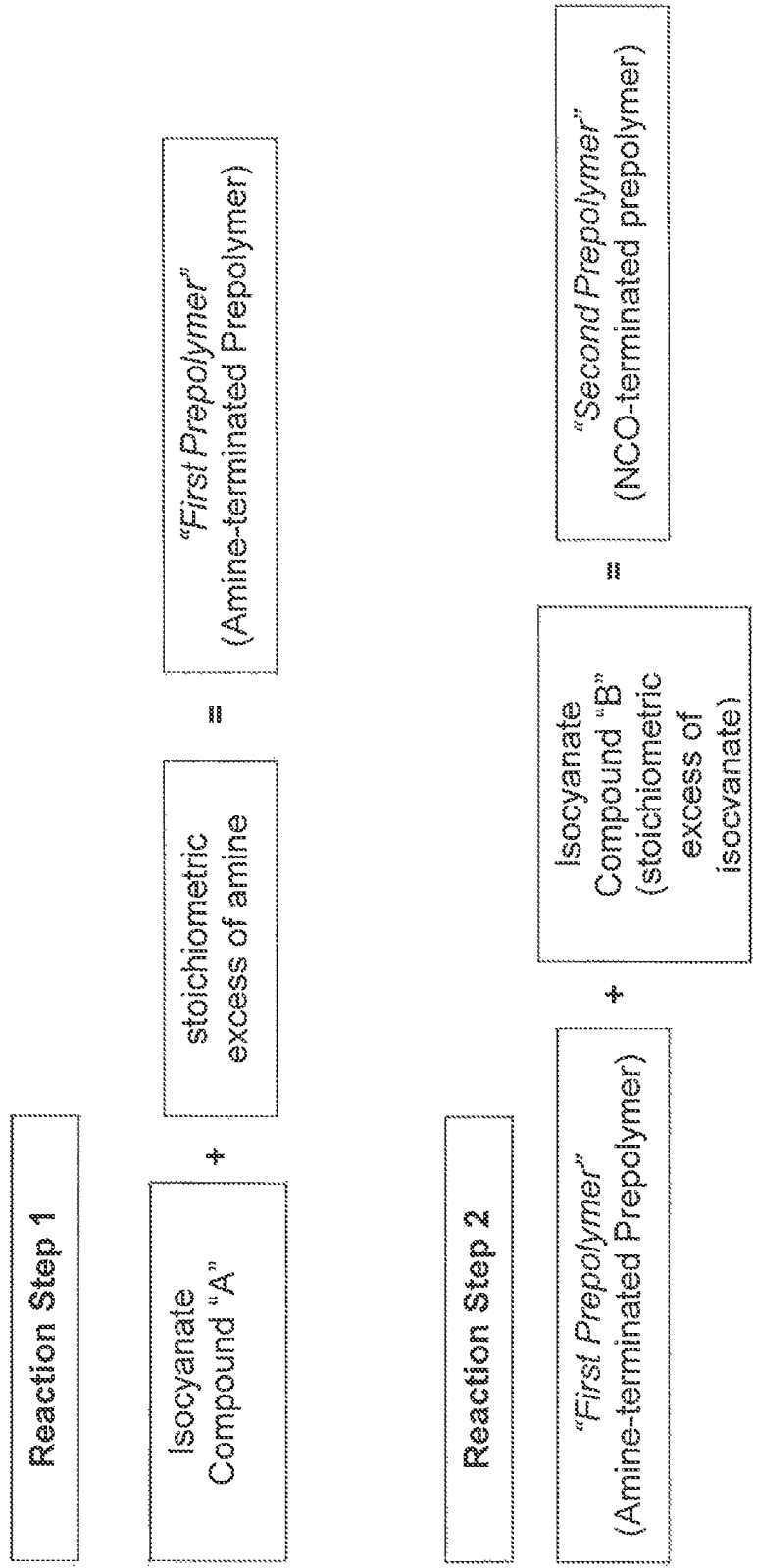
FIG. 7 is a schematic diagram showing first and second reaction steps for making the prepolymer in accordance with one embodiment of the present invention.
Figure 8:
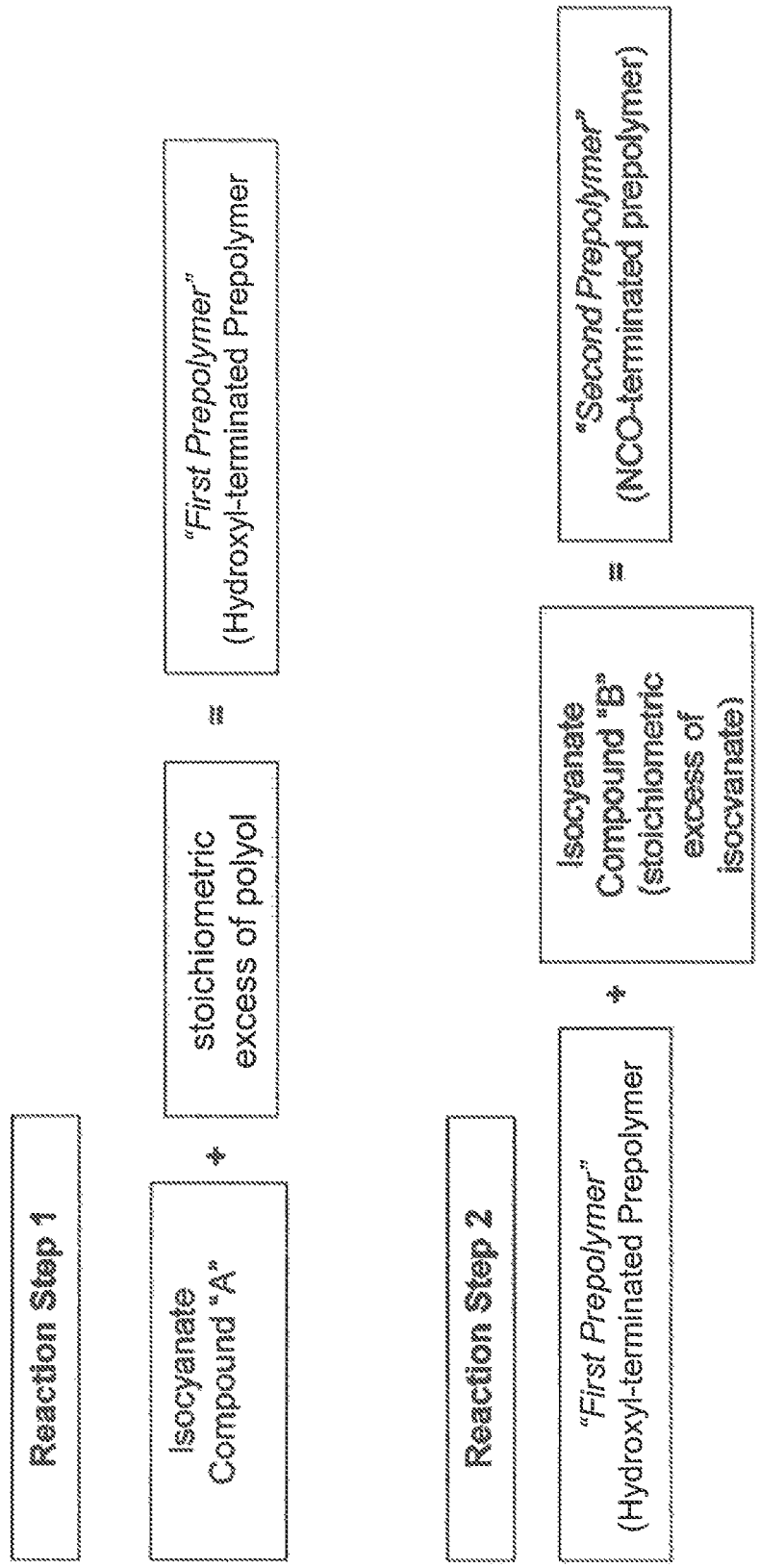
FIG. 8 is a schematic diagram showing first and second reaction steps for making the prepolymer in accordance with an embodiment of the present invention.

FIGS. 7-8 illustrate the first and second reaction steps for making the prepolymers in accordance with the present invention. In particular, FIG. 7 shows the first and second reaction steps for making a polyurea prepolymer and FIG. 8 shows the first and second reaction steps for making a polyurethane prepolymer in accordance with the present invention.

Preferably, the overall diameter of the core and all intermediate layers is about 80 percent to about 98 percent of the overall diameter of the finished ball. The core may have a diameter ranging from about 0.50 inches to about 1.65 inches. In one embodiment, the diameter of the core is about 1.20 inches to about 1.63 inches. For example, if a two-piece ball having a core and polyurea or polyurethane cover of this invention is made, the core may have a diameter ranging from about 1.50 inches to about 1.62 inches. The core may further include a moisture-resistant surface to prevent moisture from penetrating there in. When the core includes an inner core layer (center) and an outer core layer, the inner core layer is preferably about 0.50 inches or greater and the outer core layer preferably has a thickness of about 0.10 inches or greater. For example, when a multi-layer core is made, the center may have a diameter ranging from about 0.50 inches to about 1.30 inches and the outer core layer may have a diameter ranging from about 0.12 inches to about 0.50 inches. The cover of this invention has a thickness to provide sufficient strength, good performance characteristics, and durability. In one embodiment, the cover thickness is from about 0.015 inches to about 0.090 inches, preferably about 0.070 inches or less. For example, when a two-piece ball according to invention is made, the cover may have a thickness ranging from about 0.030 inches to about 0.090 inches. In another instance, when a three-piece ball is made, the thickness of the cover may be about 0.020 to 0.060 inches. Likewise, the range of thicknesses for the intermediate layer may vary, because the intermediate layer may be used in many different constructions and more than one intermediate layer may be included in the ball. For example, the intermediate layer may be used as an outer core layer, an inner cover layer, and/or a moisture/vapor barrier layer. In general, the intermediate layer may have a thickness of about 0.120 inches or less. In general, the thickness of the intermediate layer is about 0.015 to about 0.120 inches and preferably about 0.020 to about 0.060 inches. In one embodiment, the thickness of the intermediate layer is from about 0.015 inches to about 0.100 inches.

The hardness of the golf ball (or subassembly such as the core) may vary depending upon the ball construction and desired performance properties. The test methods for measuring surface and material hardness are described in further detail below. In general, surface or material hardness refers to the firmness of the surface or material. The relative hardness levels of the core layer, intermediate layer(s), and cover layer are primary factors in determining distance performance and spin rate of the ball. As a general rule, when the ball has a relatively soft cover, the initial spin rate of the ball is relatively high and when the ball has a relatively hard cover, the initial spin rate of the ball is relatively low. Furthermore, in general, when the ball contains a relatively soft core, the resulting spin rate of the ball is relatively low. The compressive force acting on the ball is less when the cover is compressed by the club face against a relatively soft core. The club face is not able to fully interface with the ball and thus the initial spin rate on the ball is lower. On the other hand, when the ball contains a relatively hard core, the resulting spin rate of the ball is relatively high. The club face is able to more fully interface with the ball and thus the initial spin rate of the ball. The surface hardness of a golf ball layer (or other spherical surface) is obtained from the average of a number of measurements taken from opposing hemispheres, taking care to avoid making measurements on the parting line of the core or on surface defects such as holes or protrusions. In general, the COR of the ball will increase as the hardness of the ball is increased. The test methods for measuring surface and material hardness are described in further detail below.

The intermediate layer(s) may also vary in hardness. In one embodiment, the hardness of the intermediate layer is in the range of about 30 to about 90 Shore D, preferably about 80 Shore D or less, and more preferably about 70 Shore D or less. For example, when an intermediate layer is formed from the composition of the invention, the hardness of the intermediate layer may be about 65 Shore D or less, preferably ranging from about 35 to about 60 Shore D. In yet another embodiment, the hardness of the intermediate layer is about 50 Shore D or greater, preferably about 55 Shore D or greater. In one embodiment, the intermediate layer hardness is from about 55 to about 65 Shore D.

There are several other physical properties of the golf ball that affect the ball's playing performance. For example, the compression of the core can affect the ball's spin rate off the driver as well as the "feel" of the ball as the club face makes impact with the ball. In general, balls with relatively low compression values have a softer feel. As disclosed in Jeff Dalton's *Compression by Any Other Name, Science and Golf IV, Proceedings of the World Scientific Congress of Golf* (Eric Thain ed., Routledge, 2002) ("J. Dalton") several different methods can be used to measure compression including Atti compression, Riehle compression, load/deflection measurements at a variety of fixed loads and offsets, and effective modulus. The test methods for measuring compression in accordance with the present invention are described in further detail below.

The "coefficient of restitution" or "COR" of a golf ball is also another important property and this refers to the ratio of a ball's rebound velocity to its initial incoming velocity when the ball is fired out of an air cannon into a rigid vertical plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize the COR under these conditions. Balls with a higher rebound velocity have a higher COR value. Such golf balls rebound faster, retain more total energy when struck with a club, and have longer flight distance. In general, the COR of the ball will increase as the hardness of the ball is increased. The test methods for measuring COR are described in further detail below. The golf balls of the present invention preferably have a "coefficient of restitution" ("COR") of at least 0.750 and more preferably at least 0.800 and compression of from about 70 to about 110, preferably from 90 to 100.

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. These and other manufacturing methods are disclosed in U.S. Pat. Nos. 6,207,784 and 5,484,870, the disclosures of which are hereby incorporated by reference. The cores of the golf balls of the invention may be formed by any suitable method known to those of ordinary skill in art. When the cores are formed from a thermoset material, compression molding is a particularly suitable method of forming the core. On the other hand, the cores may be injection molded when the cores are formed using a thermoset material.

More particularly, the polyurea and polyurethane compositions of this invention used to form the thermoset cover of other layer of the golf ball of this invention is a castable, reactive liquid that can be applied over the golf ball subassembly (for example, core and overlying casing layer) using any suitable application technique spraying such as, for example, dipping, spin coating, or flow coating methods which are known in the art. The liquid nature of the polyurea and polyurethane compositions of this invention makes it possible to be applied as a thin outer cover layer to the golf ball. For example, in one version of the casting method, the polyurea or polyurethane mixture is dispensed into the cavity of an upper mold member. This first mold-half has a hemispherical structure. Then, the cavity of a corresponding lower mold member is filled with the polyurea mixture. This second mold-half also has a hemispherical structure. The cavities are typically heated beforehand. A ball cup holds the golf ball subassembly (core and overlying casing layer) under vacuum. After the polyurea or polyurethane mixture in the first mold-half has reached a semi-gelled or gelled state, the pressure is removed and the golf ball is lowered into the upper mold-half containing the mixture. Then, the first mold-half is inverted and mated with the second mold-half containing the polyurea or polyurethane mixture which also has reached a semi-gelled or gelled state. The polyurea or polyurethane mixtures, contained in the mold members that are mated together, form the golf ball cover. The mated first and second mold-halves containing the polyurea or polyurethane mixture and golf ball center may be next heated so that the mixture cures and hardens. Then, the golf ball is removed from the mold and heated and cooled accordingly.

The intermediate layer and/or cover layer may also be formed using any suitable method known to those of ordinary skill in the art. For example, an intermediate layer may be formed by blow molding or retractable pin molding and covered with a dimpled cover layer formed by injection molding, compression molding, casting, vacuum forming, powder coating, and the like. The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple pattern as described in U.S. Pat. No. 4,960,281. Furthermore, the resultant golf balls prepared according to the invention typically will have dimple coverage greater than about 60 percent, preferably greater than about 65 percent, and more preferably greater than about 70 percent.

The polyurea and polyurethane compositions of this invention provide the golf ball with advantageous properties and features. Because the polyurea and polyurethane compositions of the invention may be used in any layer of a golf ball, the golf ball construction, physical properties, and resulting performance may vary depending on the layer(s) of the ball that include the compositions of this invention. For example, as discussed above, the polyurea and polyurethane compositions may be used to make the outer cover. The combination of the core and polyurea or polyurethane cover layer provides the golf ball with enhanced resiliency and durability while the desirable feel and playability of the ball is maintained. The polyurea and polyurethane compositions can be used to manufacture golf balls having an optimum combination of high resiliency, impact durability, and soft feel. The ball has high resiliency so that it shows good flight distance when hit off a tee. At the same time, the ball maintains a soft "feel" so that its flight path can be controlled on approach shots near the green.

Test Methods

Hardness

Shore D Hardness measurements are made pursuant to ASTM D-2240 "Indentation Hardness of Rubber and Plastic by Means of a Durometer." Because of the curved surface of the golf ball layer, care must be taken to ensure that the golf ball or golf ball subassembly is centered under the durometer indentor before a surface hardness reading is obtained. A calibrated digital durometer, capable of reading to 0.1 hardness units, is used for all hardness measurements and is set to take hardness readings at 1 second after the maximum reading is obtained. The digital durometer must be attached to and its foot made parallel to the base of an automatic stand. The weight on the durometer and attack rate conforms to ASTM D-2240. It should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. JIS-C hardness was measured according to the test methods JIS K 6301-1975. Shore C hardness was measured according to the test methods D2240-05.

Compression

For purposes of the present invention, "compression" refers to Atti compression and is measured according to a known procedure, using an Atti compression device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Cores having a very low stiffness will not cause the spring to deflect by more than 1.25 mm and therefore have a zero compression measurement. The Atti compression tester is designed to measure objects having a diameter of 1.680 inches; thus, smaller objects, such as golf ball cores, must be shimmed to a total height of 1.680 inches to obtain an accurate reading. Conversion from Atti compression to Riehle (cores), Riehle (balls), 100 kg deflection, 130-10 kg deflection or effective modulus can be carried out according to the formulas given in J. Dalton.

Coefficient of Restitution ("COR")

In the present invention, COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR=V_{out}/V_{in}=T_{in}/T_{out}$).

It is understood that the golf balls described and illustrated herein represent only presently preferred embodiments of the invention. It is appreciated by those skilled in the art that various changes and additions can be made to such golf balls without departing from the spirit and scope of this invention. It is intended that all such embodiments be covered by the appended claims.

What is claimed is:

1. A method of forming a golf ball comprising:
    providing a golf ball core;
    forming a first hydroxyl-terminated prepolymer by reacting a first isocyanate compound with a stoichiometric excess of polyol compound;
    forming an isocyanate-terminated second prepolymer by reacting the first hydroxyl-terminated prepolymer with a stoichiometric excess of a second isocyanate compound, wherein the first isocyanate compound and the second isocyanate compound are different chemical compounds, and
    wherein the first isocyanate compound and the second isocyanate compound are each selected from the group consisting of 1,4, cyclohexyl diisocyanate (CHDI); 4,4'-diphenylmethane diisocyanate (MDI); 2,4-toluene diisocyanate (TDI); 1,6-hexamethylene diisocyanate (HDI); 2,6-toluene diisocyanate; trimethyl hexamethylene diisocyanate (TMDI); 3,3'-dimethyl-4,4'-biphenyl diisocyanate (TODD); p-phenylene diisocyanate (PPDI); dodecane diisocyanate ($C_{12}DI$); m-tetramethylene xylene diisocyanate (TMXDI); 1,4-benzene diisocyanate; trans-cyclohexane-1,4-diisocyanate; 1,5-naphthalene diisocyanate (NDI); and 4,6-xylyene diisocyanate (XDI);
    reacting the second prepolymer with a hydroxyl-terminated chain extender to form a polyurethane composition; and
    forming a cover disposed about the core comprising the polyurethane composition.

2. The method of claim 1, wherein the core comprises polybutadiene rubber, polyisoprene rubber, natural rubber, ethylene-propylene rubber, ethylene-propylene diene rubber, styrene-butadiene rubber, or blends thereof.

3. The method of claim 1, further comprising the step of providing an intermediate layer disposed about the core to form an inner ball.

4. The method of claim 3, wherein the intermediate layer comprises an olefin-based ionomer.

5. The method of claim 4, wherein the olefin-based ionomer is an ethylene acid copolymer, and wherein the acid comprises methacrylic acid, acrylic acid, maleic acid, crotonic acid, fumaric acid, or itaconic acid.

6. The method of claim 5, wherein 10 to 80 percent of the acid groups in the olefin-based ionomer are neutralized.

7. The method of claim 5, wherein 80 to 100 percent of the acid groups in the olefin-based ionomer are neutralized.

8. The method of claim 1, wherein the polyurethane composition comprises a uniform distribution of hard and soft segments.

9. A method of forming a golf ball comprising:
providing a core comprising a rubber material;
providing an intermediate layer comprising an olefin-based ionomer;
forming a polyurethane composition by:
: forming a first prepolymer by reacting a first isocyanate compound with a stoichiometric excess of a hydroxyl-terminated compound;
forming a second prepolymer by reacting the first prepolymer with a stoichiometric excess of a second isocyanate compound,
wherein the first isocyanate compound and the second isocyanate compound are different chemical compounds, and
wherein the first isocyanate compound and the second isocyanate compound are each selected from the group consisting of 1,4,cyclohexyl diisocyanate (CHDI); 4,4'-diphenylmethane diisocyanate (MDI); 2,4-toluene diisocyanate (TDI); 2,6-toluene diisocyanate; 1,6-hexamethylene diisocyanate (HDI); and trimethyl hexamethylene diisocyanate (TMDI); and
reacting the second prepolymer with a chain extender; and
forming a cover disposed about the intermediate layer comprising the polyurethane composition.

10. The method of claim 9, wherein the first prepolymer comprises hydroxyl groups at the terminal ends.

11. The method of claim 9, wherein the rubber material comprises polybutadiene rubber.

12. The method of claim 9, wherein the rubber material comprises a blend of polybutadiene rubber and an elastomer selected from the group consisting of polyisoprene rubber, natural rubber, ethylene propylene rubber, ethylene propylene diene rubber, styrene-butadiene rubber, polystyrene elastomers, polyethylene elastomers, polyurethane elastomers, polyurea elastomers, acrylate rubbers, polyoctenamers, metallocene-catalyzed elastomers, and plastomers.

13. The method of claim 9, wherein the polyurethane composition comprises a uniform distribution of hard and soft segments.

14. A method of forming a golf ball comprising:
providing a core;
disposing an intermediate layer about the core to form an inner ball;
forming a polyurethane composition by:
forming a first prepolymer by reacting a first isocyanate compound with a stoichiometric excess of a hydroxyl-terminated compound;
forming a second prepolymer by reacting the first prepolymer with a stoichiometric excess of a second isocyanate compound,
wherein the first isocyanate compound is 2,4-toulene diisocyanate (TDI) and the second isocyanate compound is 4,4'-diphenylmethane diisocyanate (MDI); and
reacting the second prepolymer with a chain extender; and
forming a cover disposed about the inner ball comprising the polyurethane composition.

15. The method of claim 14, wherein the core comprises polybutadiene rubber, polyisoprene rubber, natural rubber, ethylene-propylene rubber, ethylene-propylene diene rubber, styrene-butadiene rubber, or blends thereof.

16. The method of claim 14, wherein the chain extender comprises hydroxyl groups.

17. The method of claim 14, wherein the hydroxyl-terminated compound has a first molecular weight, wherein the first prepolymer has a second molecular weight that is greater than the first molecular weight, and wherein the second prepolymer has a third molecular weight greater than the second molecular weight.

18. The method of claim 14, wherein the polyurethane composition comprises a uniform distribution of hard and soft segments.

* * * * *